United States Patent
Zhou (10) Patent No.: US 12,532,325 B2
(45) Date of Patent: Jan. 20, 2026

(54) PDCCH MONITORING METHOD AND APPARATUS, STORAGE MEDIUM, TERMINAL, AND BASE STATION

(71) Applicant: BEIJING UNISOC COMMUNICATIONS TECHNOLOGY CO., LTD., Beijing (CN)

(72) Inventor: Huan Zhou, Shanghai (CN)

(73) Assignee: BEIJING UNISOC COMMUNICATIONS TECHNOLOGY CO., LTD., Beijing (CN)

( * ) Notice: Subject to any disclaimer, the term of this patent is extended or adjusted under 35 U.S.C. 154(b) by 347 days.

(21) Appl. No.: 18/031,987

(22) PCT Filed: Oct. 14, 2021

(86) PCT No.: PCT/CN2021/123764
§ 371 (c)(1),
(2) Date: Apr. 14, 2023

(87) PCT Pub. No.: WO2022/078435
PCT Pub. Date: Apr. 21, 2022

(65) Prior Publication Data
US 2023/0389030 A1     Nov. 30, 2023

(30) Foreign Application Priority Data
Oct. 15, 2020 (CN) .......................... 202011104669.7

(51) Int. Cl.
*H04W 72/23* (2023.01)
*H04W 72/0446* (2023.01)

(52) U.S. Cl.
CPC ....... *H04W 72/23* (2023.01); *H04W 72/0446* (2013.01)

(58) Field of Classification Search
CPC .......................... H04W 72/23; H04W 72/0446
See application file for complete search history.

(56) References Cited

U.S. PATENT DOCUMENTS

2019/0223164 A1   7/2019   He et al.
2019/0349180 A1   11/2019  Lu et al.
(Continued)

FOREIGN PATENT DOCUMENTS

CN           110474755 A      11/2019

OTHER PUBLICATIONS

EPO Extended European Search Report for corresponding EP Application No. 21879478.2; issued Mar. 28, 2024.
(Continued)

*Primary Examiner* — Kevin M Cunningham
(74) *Attorney, Agent, or Firm* — CANTOR COLBURN LLP (57) ABSTRACT

A Physical Downlink Control Channel (PDCCH) monitoring method and apparatus, a storage medium, a terminal, and a base station are provided. The method includes: reporting User Equipment (UE) capability information, wherein the UE capability information includes numbers of slots included in slot groups supported by a UE, and PDCCH subcarrier space of the slot groups with the numbers of slots; receiving slot number indication information; determining a target number of slots based on the slot number indication information; and performing PDCCH monitoring in the slot group with the target number of slots.

9 Claims, 4 Drawing Sheets

(56) References Cited

U.S. PATENT DOCUMENTS

2020/0304230 A1    9/2020  Papasakellariou
2021/0314997 A1*  10/2021  Seo ..................... H04L 5/0053
2023/0119439 A1*   4/2023  Kim .................. H04L 27/26025
                                                              370/329

OTHER PUBLICATIONS

Samsung "Corrections on Ultra Reliable Low Latency Communications Enhancements"; 3GPP TSG-RAN WG1 Meeting #100bis-3; R1-2003176; e-Meeting, Apr. 20-30, 2020—change Request 38.213 CR 0104 Rev—Current version 16.1.0; 13 pages.
International Search Report corresponding to International Application No. PCT/CN2021/123764; Mailing Date, Jan. 17, 2022.
Nokia et al., "Remaining details on search space", 3GPP TSG RAN WG1 Meeting 91, R1-1720507, Nov. 27-Dec. 1, 2017, 11 pages.
NTT DOCOMO, Inc., "Offline summary for PDCCH structure and search space", 3GPP TSG RAN WG1 Meeting #94, R1-1809766, Aug. 20-24, 2018, 64 pages.

* cited by examiner

PDCCH MONITORING METHOD AND APPARATUS, STORAGE MEDIUM, TERMINAL, AND BASE STATION

CROSS-REFERENCE TO RELATED APPLICATIONS

This is the U.S. national stage of application No. PCT/CN2021/123764, filed on Oct. 14, 2021. Priority under 35 U.S.C. § 119(a) and 35 U.S.C. § 365(b) is claimed from Chinese Application No. 202011104669.7, filed Oct. 15, 2020, the disclosure of which is also incorporated herein by reference.

TECHNICAL FIELD

The present disclosure generally relates to communication technology field, and more particularly, to a Physical Downlink Control Channel (PDCCH) monitoring method and apparatus, a storage medium, a terminal, and a base station.

BACKGROUND

In existing technologies for monitoring a PDCCH, a limit on PDCCH blind detection and a limit on non-overlapped Control Channel Elements (CCEs) are defined. When a configured number of PDCCH blind detections or configured non-overlapped CCEs exceed the limit, it is called overbooking. At this time, a User Equipment (UE) drops a search space set with a highest index, until the limits on PDCCH blind detection and non-overlapped CCEs are met.

In Release-15 (Rel-15) New Radio (NR) systems, a slot-level PDCCH blind detection limit and non-overlapped CCE limit are adopted. That is, a base station (gNB) and a terminal (e.g., a UE) determine whether the limits are met in a slot, and if not, a search space set with a highest index in the slot is dropped.

In Release-16 (Rel-16) NR systems, the UE is expected to monitor corresponding PDCCH candidates per span, and accordingly a blind detection limit and a non-overlapped CCE limit within span are introduced. That is, the base station (gNB) and the UE determine whether the above limits are met within a span, and if not, all or part of a search space set with a highest index in the span is dropped.

SUMMARY

Embodiments of the present disclosure provide a PDCCH monitoring method and apparatus, a storage medium, a terminal, and a base station, which are capable of determining a number of slots in a slot group containing multiple slots, and a starting position for PDCCH monitoring in the slot group, so as to meet a requirement of using higher subcarrier space to monitor PDCCHs.

In an embodiment of the present disclosure, a PDCCH monitoring method is provided, including: reporting UE capability information, wherein the UE capability information includes numbers of slots included in slot groups supported by a UE, and PDCCH subcarrier space of the slot groups with the numbers of slots; receiving slot number indication information; determining a target number of slots based on the slot number indication information; and performing PDCCH monitoring in the slot group with the target number of slots.

In an embodiment of the present disclosure, a storage medium having computer instructions stored therein is provided, wherein when the computer instructions are executed by a processor, any of the above methods is performed.

In an embodiment of the present disclosure, a terminal including the above apparatus or including a memory and a processor is provided, wherein the memory has computer instructions stored therein, and when the processor executes the computer instructions, the above method is performed.

DETAILED DESCRIPTION

As described in the background, In Rel-15 NR systems, a slot-level PDCCH blind detection limit and non-overlapped CCE limit are adopted. That is, a base station (gNB) and a terminal e.g., a UE determine whether the limits are met in a slot, and if not, a search space set with a highest index in the slot is dropped.

Table 1 shows a correspondence between a maximum number $M_{PDDCCH}^{max,slot,\mu}$ of PDCCH candidates monitored in a slot in a serving cell and a subcarrier space $\mu$, wherein $\mu \in \{0, 1, 2, 3\}$.

TABLE 1

| $\mu$ | The maximum number $M_{PDCCH}^{max,\,slot,\,\mu}$ of PDCCH candidates monitored in a slot in a serving cell |
|---|---|
| 0 | 44 |
| 1 | 36 |
| 2 | 22 |
| 3 | 20 |

Table 2 shows a correspondence between a maximum number $C_{PDCCH}^{max,slot,\mu}$ of non-overlapped CCEs monitored in a slot in a serving cell and a subcarrier space $\mu$. Non-overlapped CCEs indicate belonging to different control resource sets, or starting OFDM symbols of PDCCH candidates being different.

TABLE 2

| $\mu$ | The maximum number $C_{PDCCH}^{max,\,slot,\,\mu}$ of non-overlapped CCEs monitored in a slot in a serving cell |
|---|---|
| 0 | 56 |
| 1 | 56 |

TABLE 2-continued

| $\mu$ | The maximum number $C_{PDCCH}^{max,\ slot,\ \mu}$ of non-overlapped CCEs monitored in a slot in a serving cell |
|---|---|
| 2 | 48 |
| 3 | 32 |

If the UE can support carrier aggregation of at most 4 downlink cells, the UE is configured with $N_{cells}^{DL,\mu}$ cells downlink scheduling cells for different subcarrier space $\mu$, and $$\sum_{\mu=0}^{3} N_{cells}^{DL,\mu} \leq 4,$$

the UE expects to monitor a maximum of $M_{PDCCH}^{max,slot,\mu}$ PDCCH candidates (including candidates with different DCI sizes and different DMRS scrambling code sequences) per cell per slot, a maximum of $C_{PDCCH}^{max,slot,\mu}$ non-overlapped CCEs per cell per slot.

If the UE can support carrier aggregation of more than 4 downlink cells, high-layer signaling indicates that the number $N_{cells}^{cap}$ of downlink cells monitored by the UE is greater than or equal to 4. For different subcarrier space $\mu$, the UE is configured with $N_{cells}^{DL,\mu}$ downlink scheduling cells. In each cell and each slot of the $N_{cells}^{DL,\mu}$ downlink cells, the UE needs to monitor $$M_{PDCCH}^{total,slot,\mu} = \left\lfloor N_{cells}^{cap} \times M_{PDCCH}^{max,slot,\mu} \times \left(N_{cells,0}^{DL,\mu} + \gamma \times N_{cells,1}^{DL,\mu}\right) \div \sum_{j=0}^{3} \left(N_{cells,0}^{DL,j} + \gamma \times N_{cell,1}^{DL,j}\right) \right\rfloor$$

PDCCH candidates including candidates with different DCI sizes and different DMRS scrambling code sequences) and $$C_{PDCCH}^{total,slot,\mu} = \left\lfloor N_{cells}^{cap} \times C_{PDCCH}^{max,slot,\mu} \times \left(N_{cells,0}^{DL,\mu} + \gamma \times N_{cells,1}^{DL,\mu}\right) \div \sum_{j=0}^{3} \left(N_{cells,0}^{DL,j} + \gamma \times N_{cell,1}^{DL,j}\right) \right\rfloor$$

non-overlapped CCEs. In addition, the UE expects to monitor a maximum of $M_{PDCCH}^{max,slot,\mu}$ PDCCH candidates (including candidates with different DCI sizes and different DMRS scrambling code sequences) per slot per cell, and a maximum of $C_{PDCCH}^{max,slot,\mu}$ non-overlapped CCEs per slot per cell.

In an existing application, if PDCCH capability reported by the UE is 4, that is, PDCCH blind detection and non-overlapped CCE detection capability of a maximum of 4 carriers are supported. When the UE is configured with 5 cells, which is greater than the capability reported by the UE, calculation needs to be made according to the above formula. There are two cells Pcell and scen where PDCCH can be transmitted, where Pcell has a 15 kHz Subcarrier Space (SCS) which can schedule scell2 and scell4 within a local cell or across cells, and scell1 has a 30 kHz SCS which can schedule scell5 within a local cell or across cells. According to the above formula, it can be known that limits on PDCCH blind detection and non-overlapped CCEs in each slot are calculated according to SCS of scheduling cells. According to calculation, for Pcell, scell2 and scell3, the PDCCH blind detection limit per slot is (4×44×3/5), and the non-overlapped CCE limit is (4×56×3/5); and for scell1 and scell5, the PDCCH blind detection limit per slot is (4×36×2/5), and the non-overlapped CCE limit is (4×56×2/5).

In Rel-16 NR systems, the UE is expected to monitor corresponding PDCCH candidates per span, and accordingly a blind detection limit and a non-overlapped CCE limit within span are introduced. That is, the gNB and the UE determine whether the above limits are met within a span, and if not, all or part of a search space set with a highest index in the span is dropped.

Specifically, details of span-level PDCCH blind detection limit and non-overlapped CCE limit are as follows.

Table 3 is a maximum number $M_{PDCCH}^{max,(X,Y),\mu}$ of monitored PDCCH candidates per span pattern (X, Y) and per serving cell selected based on span-level PDCCH monitoring, that is, the PDCCH candidate limit $M_{PDCCH}^{max,(X,Y),\mu}$ per span for the PDCCH span pattern (X, Y) in the serving cell with PDCCH subcarrier space $\mu$.

TABLE 3

| | The maximum number $M_{PDCCH}^{max,\ (X,\ Y),\ \mu}$ of monitored PDCCH candidates per span pattern (X, Y) and per serving cell selected based on span-level PDCCH monitoring | | |
|---|---|---|---|
| $\mu$ | (2, 2) | (4, 3) | (7,3) |
| 0 | 14 | 28 | 44 |
| 1 | 12 | 24 | 36 |

Table 4 is a maximum number $C_{PDCCH}^{max,(X,Y),\mu}$ of non-overlapped CCEs per span pattern (X,Y) and per serving cell selected based on span-level PDCCH monitoring, that is, the PDCCH non-overlapped CCE limit $C_{PDCCH}^{max,(X,Y),\mu}$ per span for the PDCCH span pattern (X, Y) in the serving cell with PDCCH subcarrier space $\mu$.

TABLE 4

| | The maximum number $C_{PDCCH}^{max,\ (X,\ Y),\ \mu}$ of non-overlapped CCEs per span pattern (X, Y) and per serving cell selected based on span-level PDCCH monitoring | | |
|---|---|---|---|
| $\mu$ | (2, 2) | (4, 3) | (7, 3) |
| 0 | 18 | 36 | 56 |
| 1 | 18 | 36 | 56 |

When the UE can report supporting subcarriers $\mu=0$ (15 kHz) and (30 kHz), patterns (2, 2), (4, 3) and (7, 3) are selected for span-level PDCCH monitoring.

A span is a group of consecutive symbols of a PDCCH the UE monitors in a slot. Each PDCCH monitoring is merely in one span. If the UE selects a pattern (X, Y) to monitor the PDCCH with span-level PDCCH monitoring, a span between first symbols of two consecutive spans of the PDCCH monitoring is greater than or equal to X, including a case of crossing slots. One span starts at a starting position for PDCCH monitoring and ends at an ending position for PDCCH monitoring, where the span has at most Y symbols.

Inventors of the present disclosure have found through research that in higher frequency bands, due to usage of higher subcarrier space, a number of PDCCHs and CCEs that the UE can monitor in one slot is very small, and even reliable PDCCH transmission cannot be guaranteed, such as blind detection capability of less than 16 CCEs. There is an urgent need for a PDCCH monitoring method that is capable of determining a PDCCH scheduling and monitoring rule in multiple slots, a number of slots in a slot group containing multiple slots, and a starting position for PDCCH monitoring in the slot group, so as to meet a requirement of using higher subcarrier space to monitor PDCCHs.

In the embodiments of the present disclosure, by reporting the UE capability information, the base station can configure the slot number indication information based on the UE capability information, so that the LTE can determine, based on the slot number indication information, a PDCCH scheduling and monitoring rule in multiple slots, a target number of slots in a slot group containing multiple slots, and a starting position for PDCCH monitoring in the slot group, so as to meet a requirement of using higher subcarrier space to monitor PDCCHs.

In order to clarify the objects, characteristics and advantages of the disclosure, embodiments of present disclosure will be described in detail in conjunction with accompanying drawings.

Figure 1:
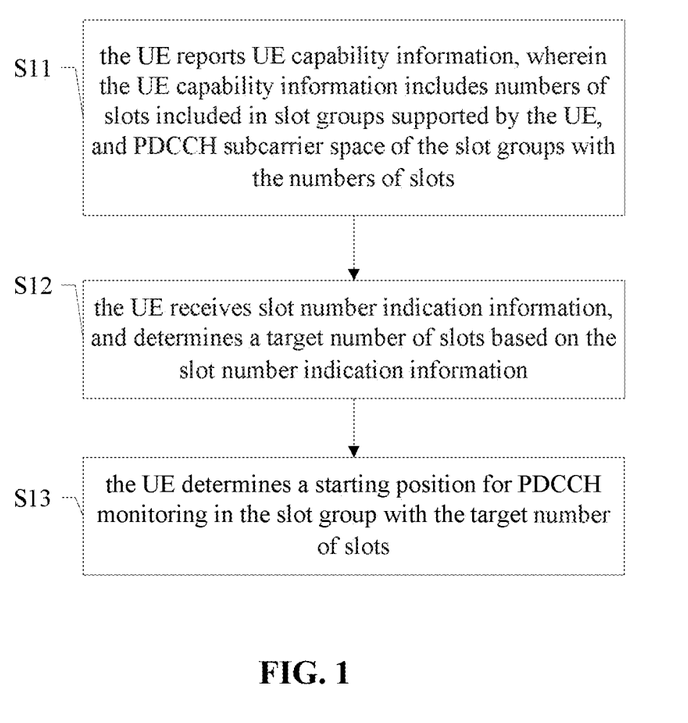
FIG. 1 is a flow chart of a PDCCH monitoring method according to an embodiment.

Referring to FIG. 1, FIG. 1 is a flow chart of a PDCCH monitoring method according to an embodiment. The method may be applied to a terminal such as a UE, and includes S11 to S13.

In S11, the UE reports UE capability information, wherein the UE capability information includes numbers of slots included in slot groups supported by the UE, and PDCCH subcarrier space of the slot groups with the numbers of slots.

In S12, the UE receives slot number indication information, and determines a target number of slots based on the slot number indication information.

In S13, the UE determines a starting position for PDCCH monitoring in the slot group with the target number of slots.

In some embodiments, in S11, several kinds of multi-slot granularity Ms can be defined under each SCS, and a maximum number of blind detections and a number of non-overlapped CCEs the UE expects to monitor under each multi-slot granularity is given, thereby several tables can be determined.

It could be understood that, in some embodiments, several groups may be provided according to different SCS or different numbers of slots. Carriers with the same parameters belong to a group, and upper limits of BD and CCE in the group are calculated.

It should be noted that the granularity Ms may indicate numbers of slots in the slot groups, and each slot group includes one or more slots. For example, the UE can support a slot group consisting of 2 slots, a slot group consisting of 4 slots, and a slot group consisting of 8 slots, then the UE capability information may include Ms=2, Ms=4, and Ms=8.

Table 5 shows a limit $M_{PDCCH}^{max,Ms,\mu}$ on PDCCH candidates based on multi-slot Ms in a serving cell with SCS of $\mu$.

TABLE 5

The maximum number $M_{PDCCH}^{max, Ms, \mu}$ of the number of PDCCH blind detections based on multi-slot Ms

| $\mu$ | Ms = 2 | Ms = 4 | Ms = 8 |
|---|---|---|---|
| 5 | 26 | 52 | 76 |
| 6 | 14 | 28 | 44 |
| 7 | 12 | 24 | 36 |

Table 6 shows a limit $C_{PDCCH}^{max,Ms,\mu}$ on PDCCH non-overlapped CCEs based on multi-slot Ms in a serving cell with SCS of $\mu$.

TABLE 6

The maximum number $C_{PDCCH}^{max, Ms, \mu}$ of PDCCH non-overlapped CCEs based on multi-slot Ms

| $\mu$ | Ms = 2 | Ms = 4 | Ms = 8 |
|---|---|---|---|
| 5 | 32 | 48 | 72 |
| 6 | 18 | 36 | 56 |
| 7 | 18 | 36 | 56 |

In some embodiments, when the UE reports UE capability information, it may report multiple patterns of (Ms, $\mu$), such as (2, 5). Thus, $M_{PDCCH}^{max,Ms,\mu}$ is determined to be 26 according to Table 5, and $C_{PDCCH}^{max,Ms,\mu}$ is determined to be 32 according to Table 6.

In some embodiments, in S12, the UE may receive the slot number indication information from the base station, and determine the target number of slots based on the slot number indication information.

Further, the UE may receive the slot number indication information from the base station through Radio Resource Control (RRC) signaling, so that the base station may continue to use existing signaling to configure information for the UE.

In some embodiments, the slot number indication information may include configuration information of search spaces, and S12 and S13 are performed according to the configuration information of the search spaces.

Specifically, in S12, said receiving slot number indication information, and determining a target number of slots based on the slot number indication information includes: receiving configuration information of one or more search spaces, wherein the configuration information includes a monitoring period of each of the one or more search spaces; and determining the target number of slots in the slot group based on a number of slots in a smallest monitoring period of the one or more search spaces.

Specifically, the monitoring periods of one or more search spaces are received, and the smallest one among the monitoring periods is determined as the target number of slots in the slot group.

For example, the target number of slots in the slot group is m based on the smallest monitoring period of all search spaces of the UE, and a pattern (Ms, $\mu$)=(m, $\mu$) is obtained according to m.

Further, the configuration information further includes an index of each of the one or more search spaces, and offset information of a monitoring moment of each of the one or more search spaces within a current monitoring period. S13 in FIG. 1 includes: determining a search space with a smallest monitoring period and a smallest index, and determining the starting position for PDCCH monitoring in the slot group based on the offset information of the monitoring moment of the search space within the current monitoring period.

Specifically, the starting position for PDCCH monitoring in the slot group may depend on the offset within the monitoring period of the search space with the smallest PDCCH monitoring period and the smallest configuration index.

Figure 2:
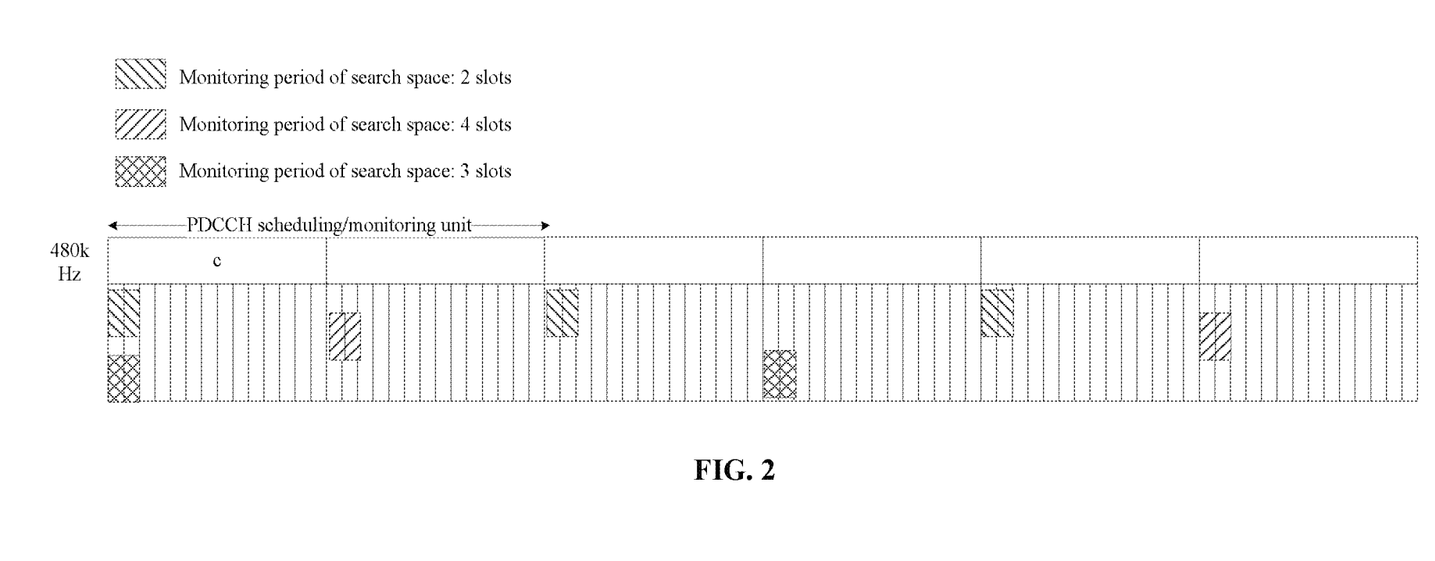
FIG. 2 is a diagram of an operation scene of determining a starting position of a slot group according to an embodiment.

Referring to FIG. 2, FIG. 2 is a diagram of an operation scene of determining a starting position of a slot group according to an embodiment.

As shown in FIG. 2, there are three monitoring periods of search spaces, namely 2 slots, 4 slots, and 3 slots. The minimum monitoring period of 2 slots serves as a target number of slots in the slot group.

Further, an offset of a monitoring moment of the search space is 0 within 2 slots, thus, the starting position of the slot group is also 0.

In subsequent operations, based on that the number of slots in the slot group is 2 and the starting position of the slot group is 0, a conventional PDCCH monitoring method may be used for monitoring, which is not limited in the embodiments of the present disclosure.

In the embodiments of the present disclosure, by receiving from the base station the configuration information of one or more search spaces which includes the monitoring period of each search space, the UE can take the number of slots in the smallest monitoring period of the search spaces as the target number of slots in the slot group, so as to realize the determination of the target number of slots included in the slot group, thereby meeting the requirement of using higher subcarrier space to monitor a PDCCH.

Further, the configuration information further includes the index of each search space and the offset information of the monitoring moment of each search space within the current monitoring period, which makes the UE determine the search space with the smallest monitoring period and the smallest index and use the offset information of the monitoring moment of the search space in the current monitoring period as the starting position of the slot group, thereby realizing the determination of the starting position for PDCCH monitoring in the slot group, which further meets the requirement of using higher subcarrier space to monitor the PDCCH.

In some embodiments, the slot number indication information may include the target number of slots, and S12 and S13 are performed according to the number of slots.

Continuing to refer to FIG. 1, in some embodiments of S12, said receiving slot number indication information, and determining a target number of slots based on the slot number indication information includes: receiving the target number of slots in the slot group directly.

Specifically, the UE may determine (Ms, µ) based on the target number of slots in the slot group additionally configured by the base station.

Further, the target number of slots in the slot group additionally configured by the base station may be transmitted through RRC signaling, so that the base station can continue to use existing signaling to notify the UE of the target number of slots in the slot group.

Further, S13 in FIG. 1 may include: determining the starting position for PDCCH monitoring in the slot group based on a first slot used for PDCCH monitoring.

For example, the target number of slots in a high-layer configured slot group determines that Ms=4, and the first slot used for PDCCH monitoring in 2 frames is 0, then the starting position of the slot group depends on the first slot in the 2 frames used for PDCCH monitoring, i.e., slot 0.

In the embodiments of the present disclosure, the UE directly receives the target number of slots in the slot group from the base station, which enables more direct determination of the target number of slots contained in the slot group by the UE, thereby meeting the requirement of using higher subcarrier space to monitor the PDCCH.

Further, the UE determines the first slot used for PDCCH monitoring as the starting position of the slot group, which enables more direct determination of the starting position for PDCCH monitoring in the slot group by the UE, thereby further meeting the requirement of using higher subcarrier space to monitor the PDCCH.

In the embodiments of the present disclosure, by reporting the UE capability information, the base station can configure the slot number indication information based on the UE capability information, so that the UE can determine, based on the slot number indication information, a PDCCH scheduling and monitoring rule in multiple slots, a target number of slots in a slot group containing multiple slots, and a starting position for PDCCH monitoring in the slot group, so as to meet a requirement of using higher subcarrier space to monitor PDCCHs.

In some embodiments, the terminal can support carrier aggregation of a plurality of downlink cells, and a number of configured carriers is greater than capability of the UE. The plurality of downlink cells of carrier aggregation may have a consistent number Ms of slots of the slot group, a consistent PDCCH subcarrier space µ, and aligned starting positions of the slot group. Alternatively, the plurality of downlink cells of carrier aggregation may have a consistent number Ms of slots of the slot group, a consistent PDCCH subcarrier space µ, and unaligned starting positions of the slot group. The PDCCH monitoring method may determine $M_{PDCCH}^{max,Ms,\mu}$ and $C_{PDCCH}^{max,Ms,\mu}$ in different ways according to the above situations respectively.

It should be noted that when the number of configured carriers is less than or equal to the capability of the UE, the determination method may be set to be the same as a non-carrier aggregation procedure. In this case, pre-set data may be used for determination as shown in Table 5 and Table 6.

In some embodiments, the method further includes: determining numbers of slots in corresponding slot groups of the plurality of downlink cells of carrier aggregation, and determining PDCCH subcarrier space of the corresponding slot groups of the plurality of downlink cells; based on that the numbers of slots in corresponding slot groups of the plurality of downlink cells are consistent, the PDCCH subcarrier space of the corresponding slot groups of the plurality of downlink cells is consistent, and starting positions of the corresponding slot groups of the plurality of downlink cells are aligned, determining an upper limit of a number of PDCCH blind detection and an upper limit of a number of PDCCH non-overlapped CCEs for the plurality of downlink cells of carrier aggregation based on the number of slots and the PDCCH subcarrier space of the slot groups of the plurality of downlink cells; and based on that the numbers of slots in corresponding slot groups of the plurality of downlink cells are consistent, the PDCCH subcarrier space of the corresponding slot groups of the plurality of downlink cells is consistent, and the starting positions of the corresponding slot groups of the plurality of downlink cells are not aligned, determining the upper limit of the number of PDCCH blind detection and the upper limit of the number of PDCCH non-overlapped CCEs for the plurality of downlink cells of carrier aggregation based on the number of slots and the PDCCH subcarrier space of the slot group of any one of the plurality of downlink cells.

Figure 3:
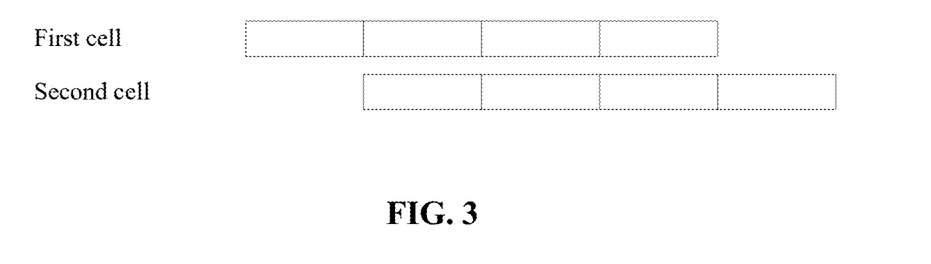
FIG. 3 is a diagram of an operation scene of determining an upper limit of a number of PDCCH blind detections and an upper limit of a number of PDCCH non-overlapped CCEs for a plurality of downlink cells of carrier aggregation according to an embodiment.

Referring to FIG. 3, FIG. 3 is a diagram of an operation scene of determining an upper limit of a number of PDCCH blind detections and an upper limit of a number of PDCCH non-overlapped CCEs for a plurality of downlink cells of carrier aggregation according to an embodiment. The numbers Ms of slots in corresponding slot groups of the plurality of downlink cells are consistent, the PDCCH subcarrier space of the corresponding slot groups of the plurality of downlink cells is consistent, and starting positions for PDCCH monitoring of the plurality of downlink cells are consistent.

In some embodiments, based on that the numbers Ms of slots in corresponding slot groups of the plurality of downlink cells of carrier aggregation are consistent, the PDCCH subcarrier space of the corresponding slot groups of the plurality of downlink cells is consistent, and starting positions for PDCCH monitoring of the plurality of downlink cells are aligned, said determining an upper limit of a number of PDCCH blind detection and an upper limit of a number of PDCCH non-overlapped CCEs for the plurality of downlink cells of carrier aggregation based on the number of slots and the PDCCH subcarrier space of the slot groups of the plurality of downlink cells includes: determining the upper limit of the number of PDCCH blind detection for the plurality of downlink cells of carrier aggregation based on a following formula: $M_{PDCCH}^{total,Ms,\mu} = \lfloor N_{cells}^{cap-SG} \times M_{PDCCH}^{max,Ms,\mu} \times N_{cells,\ SG}^{DL,Ms,\mu} \div N_{cells,\ SG}^{DL,\mu} \rfloor$, wherein Ms is the number of slots in each slot group, $\mu$ is the PDCCH subcarrier space, $N_{cells}^{cap-SG}$ is an upper limit of monitoring capability of the UE, $N_{cells,\ SG}^{DL,Ms,\mu}$ is a number of cells adopting the slot group among downlink cells monitored by SG PDCCH, $N_{cells,\ SG}^{DL,\mu}$ is a number of downlink cells monitored by the SG PDCCH, $M_{PDCCH}^{max,Ms,\mu}$ is a candidate upper limit of PDCCH monitoring, and $\lfloor\ \rfloor$ is a rounding down operation; and determining the upper limit of the number of PDCCH non-overlapped CCEs based on a following formula: $C_{PDCCH}^{total,Ms,\mu} = \lfloor N_{cells}^{cap-SG} \times C_{PDCCH}^{max,Ms,\mu} \times N_{cells,\ SG}^{DL,Ms,\mu} \div N_{cells,\ SG}^{DL,\mu} \rfloor$, wherein Ms is the number of slots in each slot group, $\mu$ is the PDCCH subcarrier space, $N_{cells}^{cap-SG}$ is the upper limit of the monitoring capability of the UE, $N_{cells,\ SG}^{DL,Ms,\mu}$ is the number of the cells adopting the slot group among the downlink cells monitored by the SG PDCCH, cells, $N_{cells,\ SG}^{DL,\mu}$ is the number of the downlink cells monitored by the SG PDCCH, $C_{PDCCH}^{max,Ms,\mu}$ is the upper limit of the PDCCH non-overlapped CCEs, and $\lfloor\ \rfloor$ is the rounding down operation.

Figure 4:
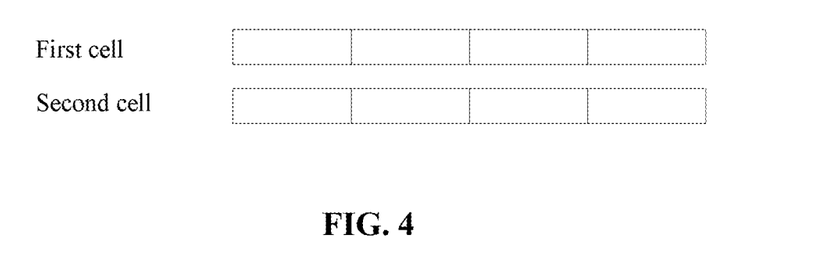
FIG. 4 is a diagram of an operation scene of determining an upper limit of a number of PDCCH blind detections and an upper limit of a number of PDCCH non-overlapped CCEs for a plurality of downlink cells of carrier aggregation according to an embodiment.

Referring to FIG. 4, FIG. 4 is a diagram of an operation scene of determining an upper limit of a number of PDCCH blind detections and an upper limit of a number of PDCCH non-overlapped CCEs for a plurality of downlink cells of carrier aggregation according to another embodiment. The numbers Ms of slots in corresponding slot groups of the plurality of downlink cells are consistent, the PDCCH subcarrier space of the corresponding slot groups of the plurality of downlink cells is consistent, and starting positions for PDCCH monitoring of the plurality of downlink cells are not aligned.

In some embodiments, based on that the numbers Ms of slots in corresponding slot groups of the plurality of downlink cells of carrier aggregation are consistent, the PDCCH subcarrier space of the corresponding slot groups of the plurality of downlink cells is consistent, and starting positions for PDCCH monitoring of the plurality of downlink cells are not aligned, said determining the upper limit of the number of PDCCH blind detection and the upper limit of the number of PDCCH non-overlapped CCEs for the plurality of downlink cells of carrier aggregation based on the number of slots and the PDCCH subcarrier space of the slot group of any one of the plurality of downlink cells includes: determining the upper limit of the number of PDCCH blind detection for the plurality of downlink cells of carrier aggregation based on a following formula: $M_{PDCCH}^{total,Ms,\mu} = \lfloor N_{cells}^{cap-SG} \times M_{PDCCH}^{max,Ms,\mu} \times N_{cells,\ SG}^{DL,Ms,\mu} \div N_{cells,\ SG}^{DL,\mu} \rfloor$, wherein Ms is a number of slots in the slot group of any one of the plurality of downlink cells, $\mu$ is the PDCCH subcarrier space, $N_{cells}^{cap-SG}$ is an upper limit of monitoring capability of the UE, $N_{cells,\ SG}^{DL,Ms,\mu}$ is a number of cells adopting the slot group of any one of the plurality of downlink cells among downlink cells monitored by SG PDCCH, $N_{cells,\ SG}^{DL,\mu}$ is a number of downlink cells monitored by the SG PDCCH, $M_{PDCCH}^{max,Ms,\mu}$ is a candidate upper limit of PDCCH monitoring, and $\lfloor\ \rfloor$ is a rounding down operation; determining the upper limit of the number of PDCCH non-overlapped CCEs based on a following formula: $C_{PDCCH}^{total,Ms,\mu} = \lfloor N_{cells}^{cap-SG} \times C_{PDCCH}^{max,Ms,\mu} \times N_{cells,\ SG}^{DL,Ms,\mu} \div N_{cells,\ SG}^{DL,\mu} \rfloor$, wherein Ms is the number of slots in the slot group of any one of the plurality of downlink cells, $\mu$ is the PDCCH subcarrier space, $N_{cells}^{cap-SG}$ is the upper limit of the monitoring capability of the UE, $N_{cells,\ SG}^{DL,Ms,\mu}$ is the number of the cells adopting the slot group of any one of the plurality of downlink cells among the downlink cells monitored by the SG PDCCH, $N_{cells,\ SG}^{DL,\mu}$ is the number of the downlink cells monitored by the SG PDCCH, $C_{PDCCH}^{max,Ms,\mu}$ is the upper limit of the PDCCH non-overlapped CCEs, and $\lfloor\ \rfloor$ is the rounding down operation.

In the embodiments of the present disclosure, based on that the numbers of slots in corresponding slot groups of the plurality of downlink cells are consistent, the PDCCH subcarrier space of the corresponding slot groups of the plurality of downlink cells is consistent, and starting positions of the corresponding slot groups of the plurality of downlink cells are aligned, the upper limit of the number of PDCCH blind detections and the upper limit of the number of PDCCH non-overlapped CCEs for the plurality of downlink cells of carrier aggregation are determined based on the number of slots and the PDCCH subcarrier space of the slot groups of the plurality of downlink cells. Based on that the numbers of slots in corresponding slot groups of the plurality of downlink cells are consistent, the PDCCH subcarrier space of the corresponding slot groups of the plurality of downlink cells is consistent, and the starting positions of the corresponding slot groups of the plurality of downlink cells are not aligned, the upper limit of the number of PDCCH blind detection and the upper limit of the number of PDCCH non-overlapped CCEs for the plurality of downlink cells of carrier aggregation are determined based on the number of slots and the PDCCH subcarrier space of the slot group of any one of the plurality of downlink cells. Therefore, a more appropriate number of slots in the slot group and PDCCH subcarrier space may be adopted.

It should be noted that in some embodiments, as the UE reports multi-slot PDCCH monitoring capability per band, under a carrier aggregation case, if some cells adopt slot-based PDCCH monitoring, some cells adopt multi-slot PDCCH monitoring, some cells adopt PDCCH monitoring per span, and even different cells use different numbers of multi-slots, for example, 4 slots or 2 slots, it is necessary to determine how to determine the number of PDCCH blind detections and the number of non-overlapped CCEs for different cell combinations in the carrier aggregation case.

Further, the PDCCH monitoring method may further include: receiving a number of downlink cells for PDCCH monitoring; and in response to the received number exceeding reporting capability of the UE, reporting the UE capability information based on a scaled number of the downlink cells.

It should be noted that the UE capability information includes a number of carriers based on slot, a number of carriers based on slot group, and a number of carriers based on span.

In some embodiments, within a band, the UE may be able to report a slot-based number C1 of Carrier Components (CCs), a multi-slot-based (i.e., slot-group-based) number C2 of CCs, and multiple combination values. For example, when reporting the UE capability information, multiple combination values of (C1, C2) are used. C1 is the slot-based number of CCs, and C2 is the multi-slot-based number of CCs.

Further, the scaled number of the downlink cells is received from the base station, or is determined by the UE based on the reporting capability of the UE.

Further, the number of the downlink cells for PDCCH monitoring may be received through high-layer signaling, so that the base station continues to use existing signaling to configure information for the UE.

Specifically, the scaled number of cells may be transmitted by the base station together with the number of the downlink cells for PDCCH monitoring using high-layer signaling, thereby improving appropriateness of scaling of the number of the downlink cells.

For example, the base station may configure to the UE (D1, D2, D3) and inform the UE to perform scaling according to (E1, E2, E3).

D1 and E1 may be slot-based numbers of CCs, D2 and E2 may be multi-slot-based numbers of CCs, and D3 and E2 may be span-based numbers of CCs.

Further, in a case of calculation overriding/dropping, the UE may perform multi-slot-based scaling and dropping according to E2.

For another example, the scaled number of the downlink cells may be determined by the UE according to its own reporting capability, so as to enhance participation of the UE.

In the embodiments of the present disclosure, the UE receives the number of downlink cells for PDCCH monitoring, and in response to the received number exceeding reporting capability of the UE, the UE reports the UE capability information based on the scaled number of the downlink cells, which is beneficial to improve a success rate of reporting.

Figure 5:
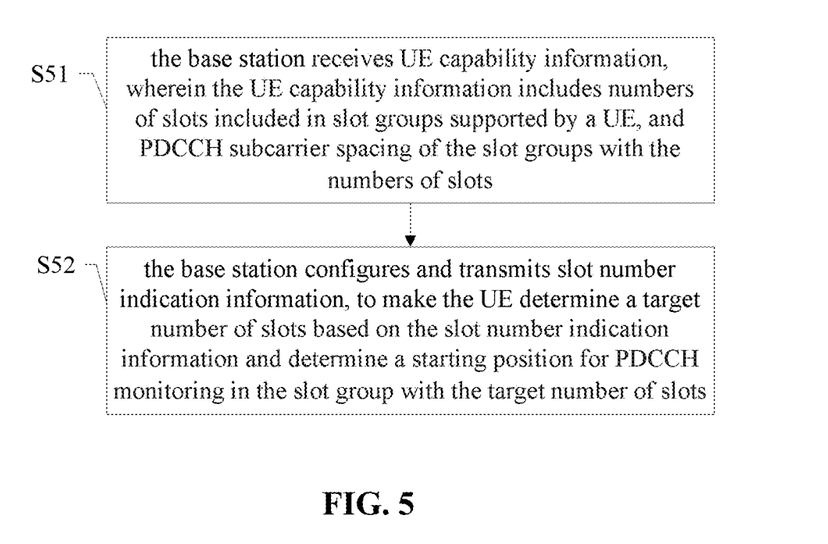
FIG. 5 is a flow chart of a PDCCH monitoring method according to an embodiment.

Referring to FIG. 5, FIG. 5 is a flow chart of a PDCCH monitoring method according to an embodiment. The method may be applied to a base station, and includes S51 and S52.

In S51, the base station receives UE capability information, wherein the UE capability information includes numbers of slots included in slot groups supported by a UE, and PDCCH subcarrier space of the slot groups with the numbers of slots.

In S52, the base station configures and transmits slot number indication information, to make the UE determine a target number of slots based on the slot number indication information and determine a starting position for PDCCH monitoring in the slot group with the target number of slots.

In some embodiments, said configuring and transmitting the slot number indication information includes: configuring and transmitting configuration information of one or more search spaces, wherein the configuration information includes a monitoring period of each of the one or more search spaces, to make the UE determine the target number of slots in the slot group based on a number of slots in a smallest monitoring period of the one or more search spaces.

Further, the configuration information further includes an index of each of the one or more search spaces, and offset information of a monitoring moment of each of the one or more search spaces within a current monitoring period, to make the UE determine a search space with a smallest monitoring period and a smallest index and determine the starting position for PDCCH monitoring in the slot group based on the offset information of the monitoring moment of the search space within the current monitoring period.

In some embodiments, said configuring and transmitting the slot number indication information includes: transmitting the target number of slots in the slot group directly, to make the UE determine the target number of slots in the slot group directly and determine the starting position for PDCCH monitoring in the slot group based on a first slot used for PDCCH monitoring.

Further, the method further includes: transmitting a number of downlink cells for PDCCH monitoring, to make the UE report the UE capability information based on a scaled number of the downlink cells in response to the transmitted number exceeding reporting capability of the UE.

Further, the scaled number of the downlink cells is transmitted by a base station, or is determined by the UE based on the reporting capability of the UE.

In the embodiments of the present disclosure, by receiving the UE capability information, the base station can configure the slot number indication information based on the UE capability information, so that the UE can determine, based on the slot number indication information, a PDCCH scheduling and monitoring rule in multiple slots, a target number of slots in a slot group containing multiple slots, and a starting position for PDCCH monitoring in the slot group, so as to meet a requirement of using higher subcarrier space to monitor PDCCHs.

More details of S51 and S52 can be referred to related descriptions of steps in FIG. 1, and are not repeated here.

Figure 6:
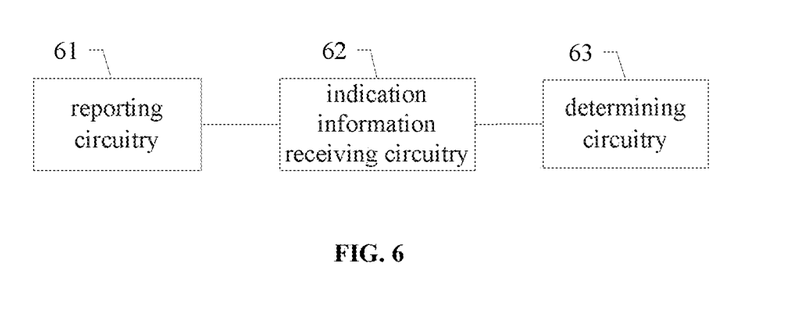
FIG. 6 is a structural diagram of a PDCCH monitoring apparatus according to an embodiment.

Referring to FIG. 6, FIG. 6 is a structural diagram of a PDCCH monitoring apparatus according to an embodiment. The apparatus may be applied to a terminal side, and include a reporting circuitry 61, an indication information receiving circuitry 62 and a determining circuitry 63.

The reporting circuitry 61 is configured to report UE capability information, wherein the UE capability information includes numbers of slots included in slot groups supported by a UE, and PDCCH subcarrier space of the slot groups with the numbers of slots.

The indication information receiving circuitry 62 is configured to receive slot number indication information, and determine a target number of slots based on the slot number indication information.

The determining circuitry 63 is configured to determine a starting position for PDCCH monitoring in the slot group with the target number of slots.

Principles, specific implementations and advantages of the apparatus can be referred to related descriptions of the method as described in the above context, and are not repeated here.

Figure 7:
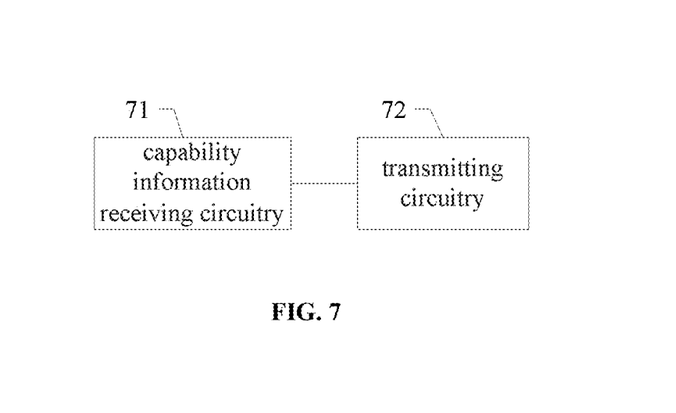
FIG. 7 is a structural diagram of a PDCCH monitoring apparatus according to an embodiment.

Referring to FIG. 7, FIG. 7 is a structural diagram of a PDCCH monitoring apparatus according to an embodiment. The apparatus may be applied to a base station side, and include a capability information receiving circuitry 71 and a transmitting circuitry 72.

The capability information receiving circuitry 71 is configured to receive UE capability information, wherein the UE capability information includes numbers of slots included in slot groups supported by a UE, and PDCCH subcarrier space of the slot groups with the numbers of slots.

The transmitting circuitry 72 is configured to configure and transmit slot number indication information, to make the UE determine a target number of slots based on the slot number indication information and determine a starting position for PDCCH monitoring in the slot group with the target number of slots.

Principles, specific implementations and advantages of the apparatus can be referred to related descriptions of the method as described in the above context, and are not repeated here.

The technical solutions of the present disclosure can be applied to 5G communication systems, 4G and 3G communication systems, and various new communication systems in the future, such as 6G and 7G communication systems.

In an embodiment of the present disclosure, a storage medium having computer instructions stored therein is provided, wherein when the computer instructions are executed by a processor, the above method is performed. In some embodiments, the storage medium may be a computer readable storage medium, and may include a non-volatile or a non-transitory memory, or include an optical disk, a mechanical disk or a solid disk.

In the embodiments of the present disclosure, the processor may be a Central Processing Unit (CPU), or other general processors, Digital Signal Processors (DSPs), Application Specific Integrated Circuits (ASICs), Field Programmable Gate Arrays (FPGAs) or other Programmable logic devices, discrete gates or transistor logic devices, discrete hardware components, and the like. A general processor may be a microprocessor or the processor may be any conventional processor or the like.

It should also be understood that the memory in the embodiments of the present disclosure may be either volatile memory or nonvolatile memory, or may include both volatile and nonvolatile memories. The non-volatile memory may be a Read-Only Memory (ROM), a Programmable ROM (PROM), an Erasable PROM (EPROM), an electrically Erasable EPROM (EEPROM), or a flash memory. The volatile memory may be a Random Access Memory (RAM) which functions as an external cache. By way of example but not limitation, various forms of RAM are available, such as Static Random Access Memory (SRAM), Dynamic Random Access Memory (DRAM), Synchronous Dynamic Random Access Memory (SDRAM), Double Data Rate Synchronous Dynamic Random Access Memory (DDR SDRAM), Enhanced SDRAM (ESDRAM), Synchronous connection to DRAM (SLDRAM), and Direct Rambus RAM (DR-RAM).

In an embodiment of the present disclosure, a terminal including a memory and a processor is provided, wherein the memory has computer instructions stored therein, and when the processor executes the computer instructions, the above method is performed. The terminal may include but not limited to a mobile phone, a computer or a tablet computer.

The terminal in the embodiments of the present disclosure may refer to various forms of UE, access terminal, user unit, user station, Mobile Station (MS), remote station, remote terminal, mobile equipment, user terminal, terminal equipment, wireless communication equipment, user agent or user device. The terminal equipment may further be a cellular phone, a cordless phone, a Session Initiation Protocol (SIP) phone, a Wireless Local Loop (WLL) station, a Personal Digital Assistant (PDA), a handheld device with a wireless communication function, a computing device or other processing devices connected to a wireless modems, an in-vehicle device, a wearable device, a terminal equipment in the future 5G network, or a terminal equipment in a future evolved Public Land Mobile Network (PLMN), which is not limited in the embodiments of the present disclosure.

In an embodiment of the present disclosure, a base station including a memory and a processor is provided, wherein the memory has computer instructions stored therein, and when the processor executes the computer instructions, the above method is performed.

The Base Station (BS) in the embodiments of the present disclosure may also be referred to as a base station equipment, and is an apparatus deployed in a wireless access network to provide wireless communication functions. For example, an equipment that provides a base station function in a 2G network includes a Base Transceiver Station (BTS). An equipment that provides the base station function in a 3G network includes a Node B. An equipment that provides the base station function in a 4G network includes an evolved Node B (eNB). In a Wireless Local Area Network (WLAN), an equipment that provides the base station function is an Access Point (AP). An equipment that provides the base station function in 5G New Radio (NR) includes a gNB and an ng-eNB, where the gNB and the terminal use NR technology to communicate, and the ng-eNB and the terminal use Evolved Universal Terrestrial Radio Access (E-UTRA) technology to communicate. Both the gNB and the ng-eNB can be connected to a 5G core network. The base station also refers to an equipment that provides the base station function in a new communication system in the future.

The base station controller in the embodiments of the present disclosure is a device for managing base stations, such as a Base Station Controller (BSC) in a 2G network, a Radio Network Controller (RNC) in a 3G network, or a device that controls and manages a base station in a new communication system in the future.

The network in the embodiments of the present disclosure refers to a communication network that provides communication services for terminals, including a base station of a radio access network, a base station controller of a radio access network, and a device on a core network side.

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

What is claimed is:

1. A Physical Downlink Control Channel (PDCCH) monitoring method, comprising:
reporting User Equipment (UE) capability information, wherein the UE capability information comprises numbers of slots included in slot groups supported by a UE, and PDCCH subcarrier space of the slot groups with the numbers of slots;
receiving slot number indication information;
determining a target number of slots based on the slot number indication information; and
performing PDCCH monitoring in the slot group with the target number of slots;
wherein each of the slot groups comprises a plurality of slots, and the method further comprises:
receiving a number of downlink cells for PDCCH monitoring; and
in response to the received number exceeding reporting capability of the UE, reporting the UE capability information based on a scaled number of the downlink cells, wherein the scaled number of the downlink cells is determined by the UE based on the reporting capability of the UE;
wherein the UE capability information comprises a number of carriers per one slot, a number of carriers per one slot group, and a number of carriers per one span, and the UE is able to report values selecting from a group consisting of the number of carriers per one slot, the number of carriers per one slot group, and the number of carriers per one span.

2. The method according to claim 1, wherein the slot number indication information comprises configuration information of one or more search spaces, and the configuration information comprises a monitoring period of each of the one or more search spaces.

3. The method according to claim 1, wherein said receiving slot number indication information, and determining a target number of slots based on the slot number indication information comprises:
receiving the target number of slots in the slot group directly.

4. A non-transitory storage medium storing one or more programs, the one or more programs comprising computer instructions, which, when executed by a processor, cause the processor to:
report User Equipment (UE) capability information, wherein the UE capability information comprises numbers of slots included in slot groups supported by a UE, and Physical Downlink Control Channel (PDCCH) subcarrier space of the slot groups with the numbers of slots;
receive slot number indication information;
determine a target number of slots based on the slot number indication information; and
perform PDCCH monitoring in the slot group with the target number of slots;
wherein each of the slot groups comprises a plurality of slots, and the processor is further caused to:
receive a number of downlink cells for PDCCH monitoring; and
in response to the received number exceeding reporting capability of the UE, report the UE capability information based on a scaled number of the downlink cells, wherein the scaled number of the downlink cells is determined by the UE based on the reporting capability of the UE;
wherein the UE capability information comprises a number of carriers per one slot, a number of carriers per one slot group, and a number of carriers per one span, and the UE is able to report values selecting from a group consisting of the number of carriers per one slot, the number of carriers per one slot group, and the number of carriers per one span.

5. The non-transitory storage medium according to claim 4, wherein the slot number indication information comprises configuration information of one or more search spaces, and the configuration information comprises a monitoring period of each of the one or more search spaces.

6. The non-transitory storage medium according to claim 4, wherein the processor is further caused to:
receive the target number of slots in the slot group directly.

7. A terminal comprising a memory and a processor, wherein the memory stores one or more programs, the one or more programs comprising computer instructions, which, when executed by the processor, cause the processor to:
report User Equipment (UE) capability information, wherein the UE capability information comprises numbers of slots included in slot groups supported by a UE, and Physical Downlink Control Channel (PDCCH) subcarrier space of the slot groups with the numbers of slots;
receive slot number indication information;
determine a target number of slots based on the slot number indication information; and
perform PDCCH monitoring in the slot group with the target number of slots;
wherein each of the slot groups comprises a plurality of slots, and the processor is further caused to:
receive a number of downlink cells for PDCCH monitoring; and
in response to the received number exceeding reporting capability of the UE, report the UE capability information based on a scaled number of the downlink cells, wherein the scaled number of the downlink cells is determined by the UE based on the reporting capability of the UE;
wherein the UE capability information comprises a number of carriers per one slot, a number of carriers per one slot group, and a number of carriers per one span, and the UE is able to report values selecting from a group consisting of the number of carriers per one slot, the number of carriers per one slot group, and the number of carriers per one span.

8. The terminal according to claim 7, wherein the slot number indication information comprises configuration information of one or more search spaces, and the configuration information comprises a monitoring period of each of the one or more search spaces.

9. The terminal according to claim 7, wherein the processor is further caused to:
receive the target number of slots in the slot group directly.

* * * * *